(No Model.) 2 Sheets—Sheet 1.
L. GAULARD & J. D. GIBBS.
SYSTEM OF ELECTRIC DISTRIBUTION.
No. 351,589. Patented Oct. 26, 1886.
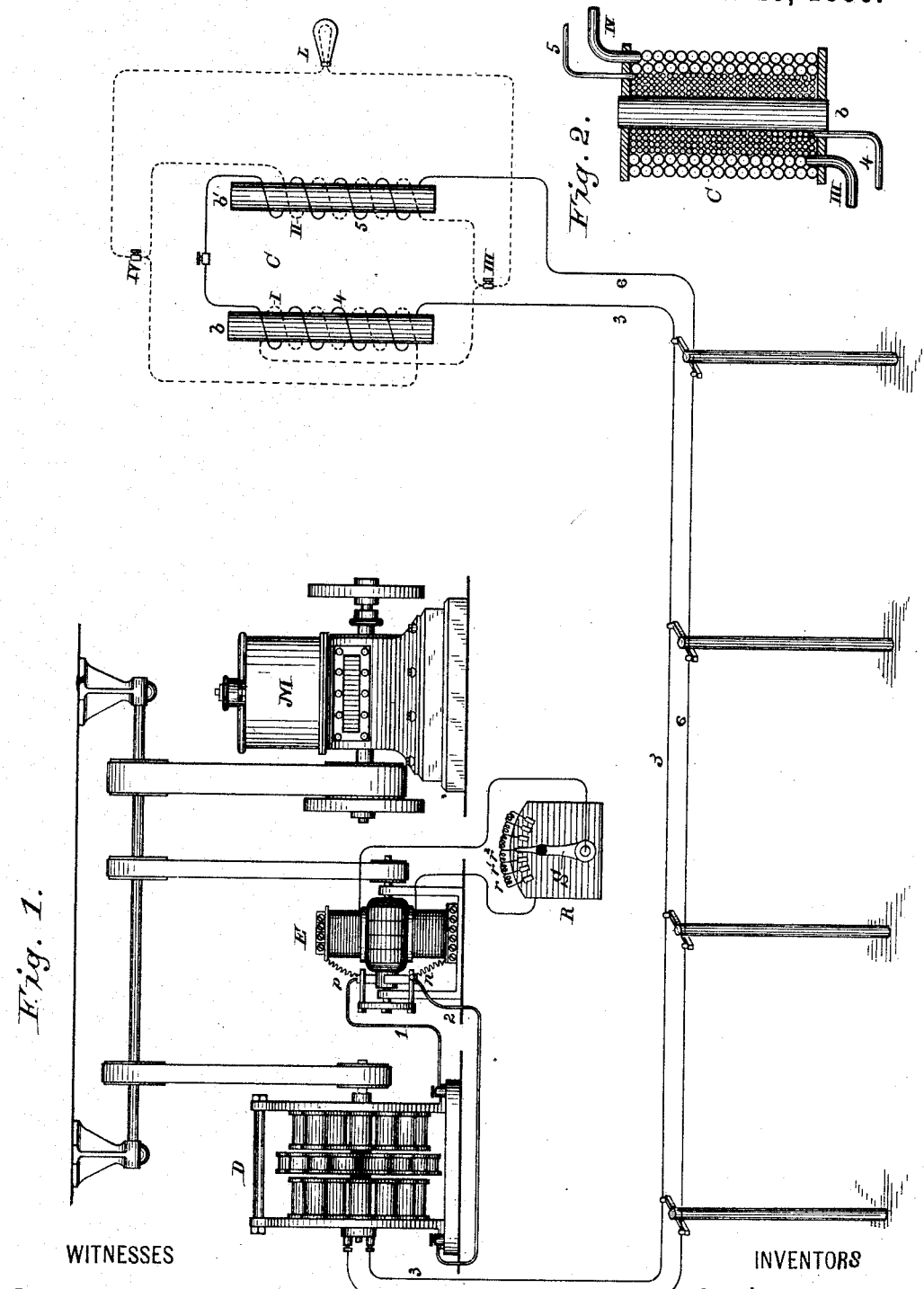
WITNESSES
E. A. Newman.
C. M. Newman.
INVENTORS
Lucien Gaulard,
John Dixon Gibbs,
By their Attorneys
Pope and Edgcomb

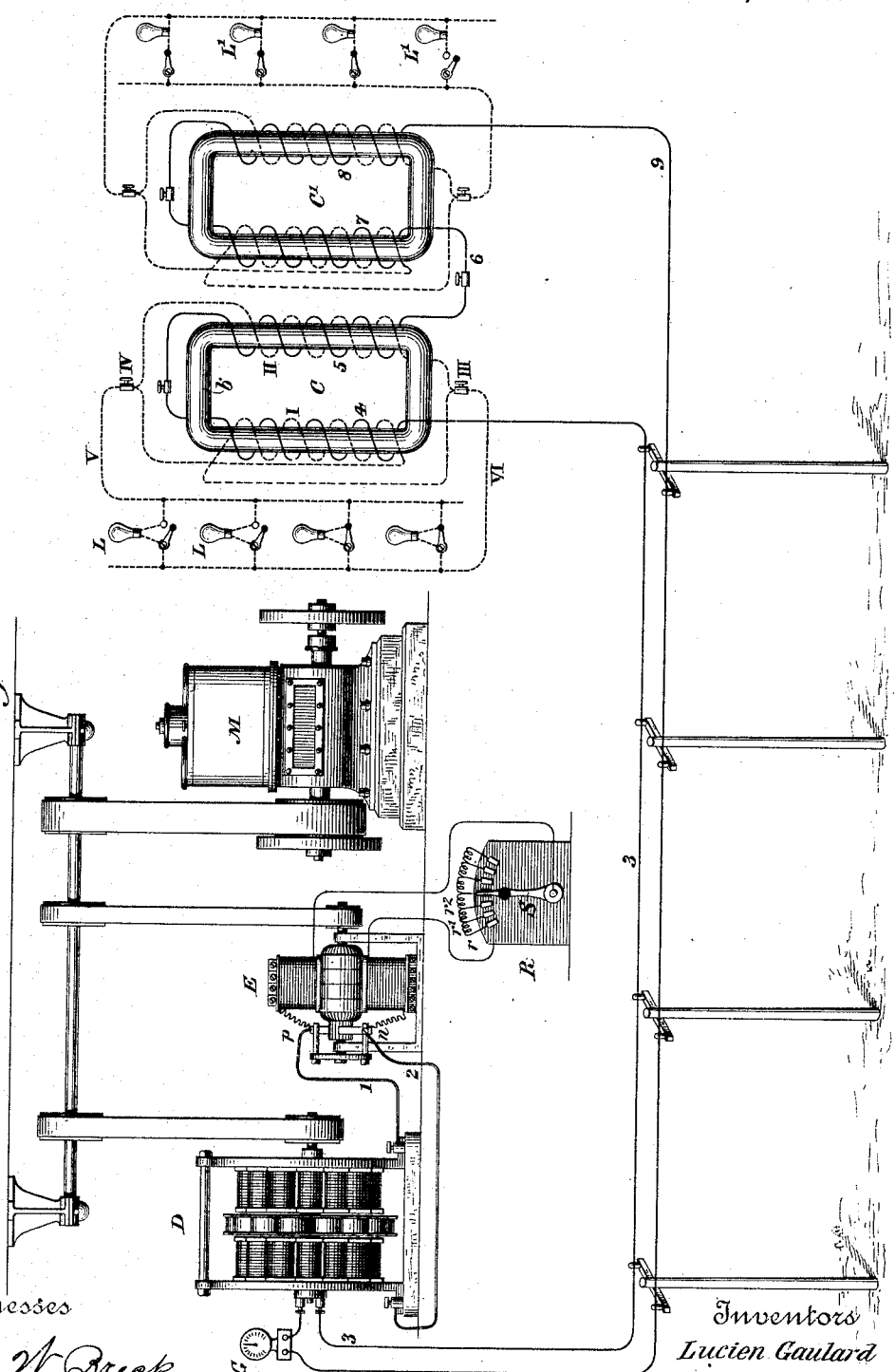

UNITED STATES PATENT OFFICE.

LUCIEN GAULARD AND JOHN DIXON GIBBS, OF THE COUNTY OF MIDDLE-SEX, ENGLAND, ASSIGNORS TO GEORGE WESTINGHOUSE, JR., OF PITTS-BURG, PENNSYLVANIA.

SYSTEM OF ELECTRIC DISTRIBUTION.

SPECIFICATION forming part of Letters Patent No. 351,589, dated October 26, 1886.

Application filed March 6, 1886. Serial No. 194,229. (No model.)

*To all whom it may concern:*

Be it known that we, LUCIEN GAULARD, a citizen of the Republic of France, and JOHN DIXON GIBBS, a subject of the Queen of Great Britain, both of the county of Middlesex, England, have jointly invented certain new and useful Improvements in Methods of and Apparatus for the Distribution and Conversion of Electric Energy, of which the following is a specification.

Our invention relates to the distribution of electrical energy for industrial purposes; and it consists in an improved art or method and an organization of apparatus, whereby the same is carried into effect, by means of which we are enabled to transmit from a central or supply station, through a main conductor, a primary electric current of comparatively small quantity but of high potential, and at a point or points more or less distant, where the said electric energy is to be utilized, to transfer the energy residing in such primary current of high potential into one or more secondary currents of lower potential but of greater quantity.

To this end the invention comprises certain combinations of apparatus having an organization and mode of operation particularly adapted to effect such transference of electric energy.

By means of our improved method and apparatus we are enabled to convey a useful quantity of electric energy to a much greater distance than has heretofore been practicable, while the cost of the necessary plant for electric lighting and other analogous purposes, especially that of the main electrical conductors, is very materially diminished.

The accompanying drawings represent an organization of apparatus which we have found to be well adapted for carrying out our invention.

Figure 1 is a theoretical plan showing the general principle of the apparatus. Fig. 2 is a transverse vertical section of one form of converter, and Fig. 3 is a diagram showing one plan of arranging the apparatus when the transference of energy is to be effected at more than one point.

In the drawings, D represents a dynamo-electric generator of suitable construction, organized for the production in the main line of alternating currents—that is to say, successive electric currents or pulsations alternately of positive and negative polarity and of equal potential and duration. We have found by experiment that the dynamo-electric machine of Alteneck, described in United States Letters Patent No. 234,353, of November 9, 1880, is well adapted for our purpose; but we do not desire to confine ourselves to any particular construction of generators for setting up alternating currents in the line, as there are many forms of these known and used which will serve sufficiently well.

In order to operate a dynamo-electric machine for the production of alternate currents, it is necessary to provide some means for maintaining its magnetic field. This may be accomplished by a separate current derived from an independent dynamo-machine, technically termed the "exciter." Such independent exciter is shown in the drawings at E. It may be an ordinary direct-current dynamo-machine of any suitable construction. The current of the exciter E is conducted from its terminals $n\,n$, by means of wires 1 and 2, to and through the field-magnet helices of the main dynamo or generator D.

In order to vary, when required, the electro-motive force of the generator D, it is convenient to effect a corresponding variation in the strength of the current in the field produced by the exciter E. This may be done in the case of a shunt-wound exciter by an adjustable resistance inserted in the field of the exciter. We have shown this plan in the drawings.

R is a rheostat composed of a series of graduated resistance-coils, $r\,r'\,r''$, &c. A movable contact-arm or other equivalent device, S, is provided, by means of which the current for maintaining the field produced by the exciter E may conveniently be regulated. The same result may be reached in other well-known ways. The power for operating the main dynamo D, as well as the exciter E, is furnished by a suitable steam-engine or other convenient motor, M.

At a point where the electric current is to be utilized for any suitable purpose—as, for instance, in one or more incandescent electric lamps—we place one or more secondary generators or converters, as shown at C in Fig. 1. The general principle of our secondary generator is analogous to that of the well-known inductorium or induction-coil, with this exception, that while the induction-coil has heretofore usually been employed to transfer electric energy from currents of low potential and great quantity into currents of high potential and small quantity, the function of the secondary generator or converter as applied in our invention is precisely the reverse of this—namely, to transfer electric energy from currents of high potential to currents of low potential and increased quantity. We have constructed converters for effecting this result in a variety of forms, all of which involve the same principle. In order that this principle may be better understood, we will describe the construction and mode of operation of a simple form of the converter, which we have shown at C in Fig. 1. Two iron cores, $b$ $b'$, are preferably built up from a large number of small soft-iron wires insulated from each other and mechanically secured together in a solid bundle.

It is usually preferable to unite the ends of the cores, so that they will become magnetically continuous. In Fig. 3, for example, we have shown the cores in the form of a rectangle; but the core or cores may be straight cylinders or closed figures of oval, annular, horseshoe, or other shape, this being merely a matter of convenience in construction or economy in operation, but involving no change of principle. Around the cores $b$ $b'$ the primary electric conductors 4 and 5 are disposed helically in the manner shown in the drawings, which, however, are intended to represent the arrangement of these conductors in a symbolical or typical manner only, the actual construction being preferably similar to that shown in Fig. 2, hereinafter to be described.

By inspection of the drawings it will be seen that one conductor, 4, is coiled upon the left-hand portion of the core, and the other similar conductor, 5, upon the right-hand portion, and the two conductors 4 and 5 are then connected at their adjacent ends, that a current may traverse them in series, and thus develop magnetism in the iron cores $b$ $b'$, so as to establish a magnetic field surrounding or enveloping said cores and adjacent thereto. The secondary conductors I and II are disposed in precisely the same manner around the cores $b$ and $b'$ and within the same magnetic field. In the particular arrangement shown in Figs. 1 and 3 of the drawings each convolution of the secondary conductor is interposed between two adjacent convolutions of the primary conductor, so that the number of convolutions, as well as their mean distance from the axis of the core, is the same. Experience indicates that the more nearly the last-mentioned relation is preserved the higher will be the efficiency of the apparatus. The relative disposition of the primary and secondary helices may otherwise be greatly varied without material change in the result. For example, one may be superposed upon the other, as in Fig. 2, or the two may be placed upon different parts of the same core or cores, according to circumstances.

It is to be observed that the secondary conductors shown in Fig. 1 of the drawings are not united in series like the primary conductors; but their ends are joined together, as shown at III and IV, in parallel or multiple arc, and from the last-named junction-points of the secondary the conductors V and VI are led to an electric lamp or other translating device, L, by which the circuit is completed.

We will now describe the mode of operation of the apparatus.

When the dynamo-electric generator D is set in operation, a rapid succession of alternating positive and negative currents or pulsations of equal potential and duration, technically termed an "alternating current," is set up in the main or primary conductor, the path of which may be traced in Fig. 1 as follows: From one terminal of the generator D by the line-conductor 3 to the primary conductor 4 5 of the secondary generator C, thence returning by the line-conductor 6 to the opposite terminal of the generator. The alternate current proceeding from the primary generator D, by its inductive action in the secondary generator C, creates a magnetic field of alternate polarity, and this alternation of the magnetism of the field, in accordance with a well-known law, generates by inductive reaction an alternate current in the closed circuit of a secondary conductor situated within it. This secondary current may be utilized for electric lighting or other purposes in the same manner that primary currents ordinarily are, by including proper translating devices in said secondary circuit.

The most important and characteristic feature of our invention is that which renders it possible to make use of alternating and equal positive and negative currents of moderate quantity but of very high potential in the primary or main-line circuit, and to convert these into secondary or induced currents of much greater quantity but of correspondingly lower potential at the place of consumption, which secondary currents are employed to do the required work. This is a result the attainment of which is of the utmost importance in the art of electrical distribution, as it renders practicable the employment of insulated main conductors of comparatively small size and moderate cost for the transmission of large amounts of energy to great distances. We will now explain the means by which this increase of quantity and reduction of potential in the secondary circuit is effected.

Let it be assumed that we have an electric lamp, as L, in Fig. 1, so constructed as to work at maximum efficiency when rendered luminous by an electric current of one ampère. Let it also be assumed that, for economical or other reasons, it is desired to employ an alternate current of 0.5 ampère only in the primary circuit. The necessary increase in the quantity of the secondary current will in such case be effected by the apparatus when arranged precisely as shown in the figure, for as the primary conductor of the converter C is connected in series, while the secondary conductor (with an equal number of convolutions situated in the same magnetic field) is arranged with one half its convolutions in multiple arc with the other half, the result will be precisely the same as if the actual number of convolutions of the secondary conductor were only half as many as those of the primary. The total resistance of the secondary conductor, when thus connected, is obviously only one-fourth as great as that of the primary, the secondary being double the cross-section and virtually only one-half the length of the primary. When an electric current of alternating polarity is caused to pass through the primary conductor of the converter C, Fig. 1, it creates by electro-magnetic induction a magnetic field, the intensity of which within the ordinary limits of working is proportional to the current (expressed in ampères) passing through the conductor. Each alternation so produced in the magnetism of the field tends to set up a definite electro-motive force in each separate convolution of any conductor traversing the field. In the primary conductor this electro-motive force opposes itself temporarily to the primary or magnetizing current; but as it is of inferior and rapidly-decreasing potential it acts merely to delay, and not to prevent, the magnetization of the field. An approximately equal electro-motive force is at the same time set up in each convolution of the secondary conductor; but as the latter (in the present example) makes only half the number of convolutions within the field, the total electro-motive force of the secondary current will be only half that of the primary current. Inasmuch, however, as the value of any current is expressed by the quotient of the electro-motive force divided by the resistance, and as the resistance of the secondary coil is only one-fourth that of the primary, the actual number of ampères in the secondary current will be approximately twice as many as in the primary current. Strictly speaking, however, the inductive action may be said to be determined not by the number of convolutions, but by the extent of conductor, measured in linear units, which is in inductive relation to the magnetic field, assuming the lines of force in such field to be uniformly distributed. In order to produce a proper result, it is preferable that the resistance offered by that portion of the linear conductor in the magnetic field which is traversed by the primary current shall exceed the resistance of the conductor in the same field traversed by the secondary current in an inverse ratio to the increase in current strength or reduction of potential which it is desired to effect.

Any required number of converters of the general construction described may have their primary circuits united with or included in the conductors leading from the primary generator. The manner of connecting such converters, whether in series, multiple arc, multiple series, or otherwise, will be understood by those skilled in the art to which our invention relates without the necessity of further explanation. One arrangement is, however, indicated in Fig. 3, in which a second converter, C', is placed in circuit provided with a secondary conductor and an independent group of lamps. The primary current traverses the circuits 3 4 5 6 7 8 9, passing through the primary wires of both converters, and the separate groups of lamps are shown at L and L'.

We do not herein claim the connection of the converters in the line in any other arrangement than we have illustrated in the drawings. It must not be forgotten, however, that the consumption of energy in the main or primary circuit will in all cases bear a certain definite ratio to the work which is being done, or at least to the resistance which is offered at any given time in the secondary circuits of the converters, whether one or many.

The attendant at the generator, by means of an electro-dynamometer or other suitable current-indicator, G, Fig. 3, can readily detect any change in the strength of the current due to variations in the consumption, and by moving the arm S can correspondingly raise or lower the electro-motive force of the generator D, so as to bring the current back to its normal strength.

The converter C may be constructed in various ways. We have attained excellent results by constructing it in the manner more particularly shown and described in prior United States patents, Nos. 297,924, of April 29, 1884, and 316,354, of April 21, 1885. Another form which gives excellent results in practice is shown in Fig. 2, in which $b$ is a core formed of a bundle of iron wires, around which the primary wire 4 5 is coiled in a helix of the ordinary form. The helix of the secondary wire III IV is superposed upon that of the primary in the manner shown. The sectional area of the secondary wire is here shown as four times that of the primary, while the number of convolutions is only one-fourth as great. We nevertheless do not desire to confine ourselves to any particular construction of the converter, as this is quite immaterial so long as the essential principles which we have hereinbefore set forth are not departed from.

We claim as our invention—

1. The hereinbefore-described art or method of electrical distribution and conversion, which consists in establishing in a closed electric circuit a current of alternate and equal positive and negative potential, producing, by the influence of such current, an inductive field of alternate polarity, and thereby inducing, in translating devices situated in an independent closed circuit traversing such field, a similar alternating secondary current of greater quantity and less potential than the originating or producing current.

2. In a system of electrical distribution, an inductorium or converter in which the length of that portion of the conductor traversed by the primary current within the magnetic field created by itself exceeds the length within the same field of the conductor traversed by the secondary current, in combination with a dynamo-electric generator producing alternating electric currents or pulsations of equal potential and duration, and translating devices actuated by said secondary current.

3. In a system of electrical distribution, an inductorium or converter in which the resistance of that portion of the conductor traversed by the primary current within the magnetic field created by itself exceeds the resistance of that portion of the conductor traversed by the secondary current which lies within said field, in combination with a dynamo-electric generator producing alternating currents or pulsations of equal potential and duration, and translating devices actuated by said secondary current.

4. In a system of electrical distribution, a dynamo-electric machine organized for the production of alternate positive and negative currents equal to each other in potential and duration, in combination with the primary circuit of an inductorium or converter organized to induce in its secondary circuit alternating currents of lower potential and greater quantity than those of the primary circuit, and one or more translating devices actuated by said secondary currents.

5. In a system of electrical distribution, the combination of an inductorium or converter having its primary and secondary circuits constantly closed, a dynamo-electric generator for producing alternating currents of equal potential and duration included in said closed primary circuit, and one or more translating devices included in said closed secondary circuit, substantially as set forth.

In testimony whereof we have hereunto subscribed our names this 4th day of February, A. D. 1886.

LUCIEN GAULARD.
JOHN DIXON GIBBS.

Witnesses:
FRANK L. POPE,
DOUGLAS I. NEWTON.